3,278,486
COLORED POLYMERIC MATERIALS
Richard L. Meek, Decatur, Ga., Charles E. Feazel, Birmingham, Ala., Phillip M. Daugherty, Decatur, Ga., Frances Combs Mallory, Ann Arbor, Mich., and Eugene P. Cofield, Jr., Atlanta, Ga., assignors to Scripto, Inc., a corporation of Georgia
No Drawing. Filed Feb. 17, 1959, Ser. No. 793,682
1 Claim. (Cl. 260—47)

This invention relates to colored polymers and methods of producing and/or preparing same, whereby the colored polymer is produced by chemically bonding a coloring material such as a polyfunctional dye or pigment within the polymeric structure of the colored polymer in a manner so that the molecules of the coloring material are internal, integral, parts of the segmers that comprise the polymeric structure.

This incorporation of molecules of coloring material within a polymeric structure may be caused to occur (a) during initial preparation of the polymer or (b) during further polymerization of a preformed polymer.

It is well known in the art that polymers are high molecular weight compounds produced by recurring addition or condensation of monomers, comers, or comonomers, i.e., lower molecular weight compounds. For the sake of simplicity, the term "monomer" will be used throughout the remainer of this specification and in the claim to designate a compound that may be a monomer, a comer, or a comonomer. The polymer may have an empirical formula that is equivalent to that of the monomers used in its preparation (addition polymers), or the polymer may have an empirical formula that differs from that of the monomers used in its preparation (condensation polymers). For polymerization to occur the monomers must possess reactive or functional groups, a functional group being an arrangement of atoms that might lead to a reaction. Examples of such arrangements are epoxide, hydroxyl, amino, carboxyl, isocyanate groups, etc. A compound or monomer containing one such group is designated monofunctional; a compound or monomer containing two such groups is designated difunctional; a compound or monomer with three such groups trifunctional, etc., or more generally, a compound or monomer containing more than one such functional group is designated polyfunctional. Polyfunctional monomers may contain a number of like functional groups, but equally applicable a polyfunctional monomer may contain a number of dissimilar functional groups.

Examples of commonly known polymers include polyamides, polyesters, or mixed polyester-polyamides; a polyamide being the product of the combination of a polyfunctional amine and a polyfunctional acid; a polyester being the product of the combination of a polyfunctional alcohol and a polyfunctional acid; and a mixed polyester-polyamide being the product of the combination of (1) a polyfunctional acid and a compound containing both amine and alcohol functional groups or (2) a polyfunctional acid and a mixture of a polyfunctional amine and a polyfunctional alcohol.

In the past, polymers have been prepared by the combination, condensation, or addition of colorless monomers. Some colorless monomers that have been commercially used have some degree of discoloration due to the presence of impurities, but such compounds are, in reality, colorless materials. In general polymeric products were previously colored by dispersing or dissolving a pigment or dye therein or by absorption thereon. In such cases, the coloring materials do not constitute a part of the polymeric structure and are present as discrete components. It is also recognized that certain dyes have been reacted with preformed polymers to form polymeric products in which the dye is terminally appended to the polymeric structure, this being quite similar to dyeing processes. Such a polymeric structure may be represented by the following:

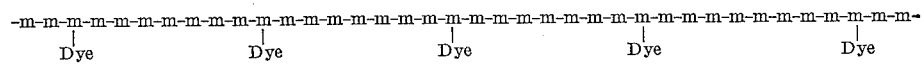

where —m— represents a radical derived from a colorless monomeric material, or materials, —Dye— represents a radical derived from a molecule of a dye.

However, the novelty of this invention lies in incorporating colored substances into the internal polymeric structure in such a manner that the molecules of the coloring material becomes integral parts of the segmers of the polymer. This may be represented by the following:

–m–m–m–m–m–m–Dye–m–m–m–m–m–m–Dye–m–m–m–m–m–m–Dye–m–m–m–m–m–m–Dye–m–m–m–m–m–m– where —m— represents a radical derived from a colorless monomeric material, or materials, and —Dye— represents a radical derived from a polyfunctional dye molecule.

Dyes or pigments in commerce, as contrasted to polymers, are relatively low molecular weight materials which contain chromophoric groups and auxochromes. Dyes or pigments of interest to this invention are only limited in that dyes or pigments which do not possess reactive or functional groups in addition to the chromophore are excluded. Dyes possessing functional groups may fall into the chemical classification of an amine, an isocyanate, a mercaptan, an alcohol, an acid (carboxylic or sulfonic), an amino-alcohol, an amino-acid, an aldehyde, or may be dyes containing any combination of these functional groups.

Differentiation between the terms "dye" and "pigment" as used commercially is determined by the solubility of a given colorant in its medium of application. If the colorant is soluble in the medium, it is normally considered to be a dye. On the other hand, if the colorant is insoluble in the medium, it is normally considered to be a pigment. Since there is no clear distinction between the terms "dye" and "pigment" and since for the purposes of this invention the terms are synonymous (i.e., either may possess functional groups), the term "dye" shall be construed to include the term "pigment." It should be obvious to one skilled in the art that these dyes may exist in a latent or leuco form which may not be colored prior to incorporation into the colored polymer.

The advantages and applications of colored polymeric substances are numerous and include the production of a colored product where the color producing material is an internal, integral part of the repeating structural unit, or segmer of said colored polymeric product, and is not introduced by dispersing or dissolving therein, thereby eliminating the need for rigorous grinding, milling, or blending of the color component.

Another outstanding advantage of these colored polymers is that they, due to the fact that the color component is retained within the polymeric structure unlike dispersed pigments or dissolved dyes, do not possess the tendency to migrate, flocculate, or settle out (i.e., the color producing structure is actually chemically contained within the repeating structural unit or segmer of the polymer).

A further advantage is the increased compatibility of the colored polymeric substances with other polymers, plastics, vehicles, paints, and inks. A useful application that demonstrates this advantage is the use of a fluid colored polymer as a combination coloring material and plasticizer for polymer compositions that normally are plasticized with colorless fluids and colored by mechanically blending with a monomeric coloring agent.

When a colored polymer is used in combination with another polymeric material, for example, as a plasticizer, its polymeric structure enhances the ability of the coloring component to remain uniformly distributed throughout the polymeric composition.

Another advantage and application is that a polyamide or polyester which incorporates the coloring component into the polymeric structure may be used to produce fibers from which the color cannot be worn off without comparable loss of the fiber itself, and in which the color would be fast to rubbing, washing, drycleaning, weathering, and sunlight. The use of colored polymers in producing fibers for clothing would therefore eliminate the appearance of light colored areas in the vicinity of knees, elbows, and seats which are characteristic of garments produced from synthetic fibers dyed by normal processes.

A further advantage of these colored polymers is that they possess a more uniform color than a polymer which has had its dye introduced by mechanical means. Also in certain applications, due to increased utilization of the coloring faculties of the dye, a product is produced which possesses a more intense color shade than one that is produced by mechanically incorporating therein an equivalent amount of the same dye that was used to prepare said colored polymer. This enhancement of the coloring power of a dye by chemically incorporating it into a polymer structure is readily apparent in polyurethanefoams, for example, or in other plastic forms where the plastic material is quite thin.

In summary, the colored polymers of this invention may be used for preparing colored fibers for use in clothing, carpeting and other fabric material that would be subjected to considerable wear. They may also be used for producing colored solid plastic bodies for use in various products; specific examples being toys, novelty items, construction or building panels and boat and automobile bodies. Colored plastic of this invention, when used for these latter purposes, would facilitate repair, patching and color matching since the color imparting constituent would be an actual part of the plastic used. In addition both decorative and protective coatings may be produced from the colored polymers which are the subject of this invention. Colored polymeric films, both rigid and flexible, and colored polymeric foams, again both rigid and flexible, may be produced from these colored polymers. Light filters that are specific for chosen wavelengths may be produced from colored polymers. This would have application for use in sun glasses, automobile windshields, awnings and the like. Colored polymers can be used as both the colorant and thickening agent in inks, paints and similar materials. In addition colored polymers may be formed into plastic pipe and may be used to coat wire with a protective covering. For pipe and for wire coating these polymers could be utilized for color coding. In the case of a coating for wire, it would insure that the metal remained untarnished so that, when the coating is subjected to the heat of a soldering iron, clean metal would be available to be wet by the solder and thus insure good joints. Other applications should be apparent to one familiar with polymer utilization.

To one enlightened by the teaching of this invention, it will become apparent that a dye molecule possessing a plurality of functional groups, such as amine and alcoholic groups, can react with monomeric material containing acidic groups to produce colored polymers that are both amides and esters, i.e., a polyamide-polyester. In addition, it will likewise become apparent that a dye molecule possessing a plurality of functional groups that include amine, alcoholic, and sulfonic acid, or carboxylic acid groups can react with monomeric material containing acidic and basic functional groups to yield colored polymers of the type characterized by this invention that include in the structural formula, linkages (1) that result from interaction between the colorless monomer and the dye, (2) that result from interaction between dye molecules, and (3) that result from interaction between colorless monomers.

The examples which follow illustrate various combinations within the scope of this invention, but are not to be construed as limiting the invention in any way.

The following chemical formulae are included to identify the dye materials referred to in the examples. It is not the intent here to limit the dyes that can be used, but to indicate some of the many types that are applicable. Reference is made to Color Index (C.I.) numbers for those dyes that have been so classified.

1-(2-carboxyphenylazo)-2-hydroxy-3-naphthoic acid

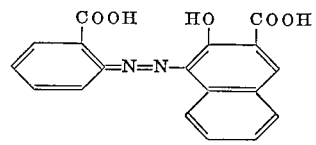

3,3'-dicarboxy-4,4'-dihydroxy-azobenzene

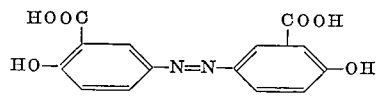

Eosine (C.I. 45380)

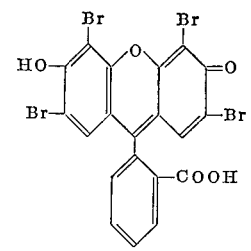

1-(4-hydroxyphenylazo)-2-hydroxy-naphthalene

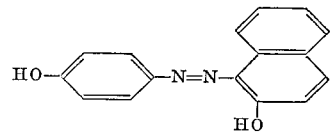

Alizarine Blue 2RC (C.I. 58605)

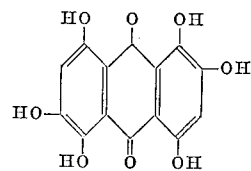

Safranine T (C.I. 50240)

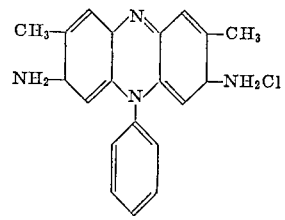

1 - (4 - aminophenylazo) - 2 - methyl - 4 - amino - 5 - methoxybenzene

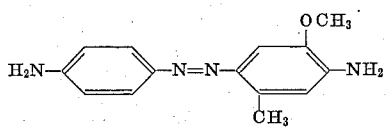

Sulphon Acid Blue RA Extra (C.I. 13390)

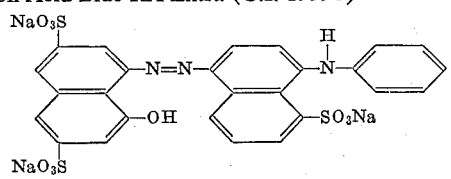

Guinea Green BA Extra Conc. (C.I. 42085)

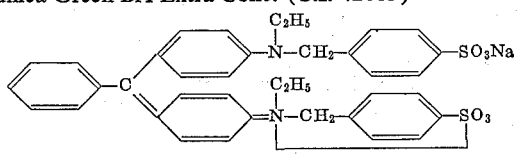

Copper chelated sodium salt of 1-(3-sulfo-1-hydroxyphenylazo)-6-sulfo-2-hydroxynaphthalene

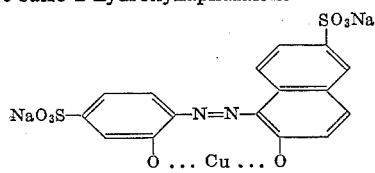

Rhodamine B Base (C.I. 45170B)

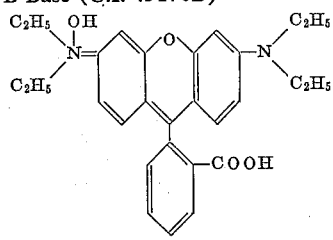

Methyl Violet Base (C.I. 42555B)

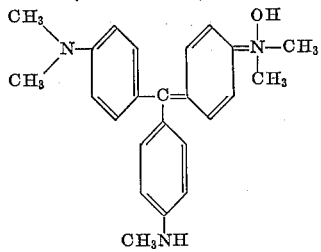

1,3-dimethyl-1,3-diphenylguanidine salt of Congo red

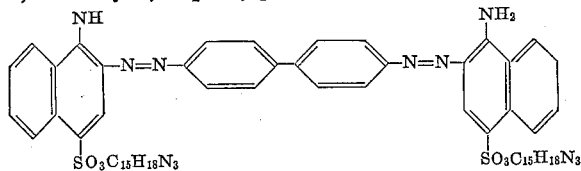

Monomeric polyfunctional amines are caused to react with polyfunctional acid dye molecules or with polyfunctional acids in the presence of a polyfunctional dye molecule which dye molecule is capable of reacting with either the amine or the acid. Examples 1 to 4 below show that the product of such a reaction is a colored polyamide containing, as an internal, integral, repeating part of the molecular structure, the dye molecules.

Illustrative structures for typical polyamides may be conveniently represented by the following:

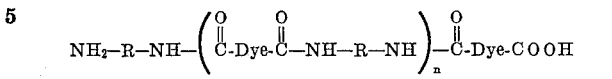

(In Example No. 1 below; R is $(CH_2)_6$, —Dye— is the phenylazo(2-hydroxy) naphthalene 2-(phenyl), 3-naphthyl) diradical and $n$ is a numerical radical subscript)

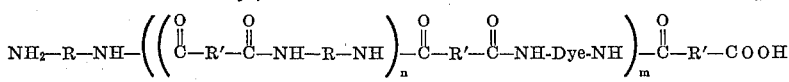

(In Example No. 4 below; R is $(CH_2)_6$, R' is $C_6H_4$, and $m$ and $n$ are numerical subscripts. —Dye— is the phenylazo(2-methyl-5-methoxy)benzene p,p' diradical.)

Example 1

The dye 1-(2-carboxyphenylazo) - 2 - hydroxy-3-naphthoic acid (8.40 g., 0.025 mole) and hexamethylenediamine (72%) (4.03 g., 0.025 mole) were mixed. Five grams of the mixture were then added to 20 g., hexamethylenediamine (72%) and heated for 10 hr. at 170–180° C. under an atmosphere of carbon dioxide. The reaction product was poured into water to remove the excess hexamethylenediamine and to precipitate the product, a dark red, solid dye-polymer.

Example 2

A polyamide was prepared by heating 1-(2-carboxyphenylazo)-2-hydroxy-3-naphthoic acid (3.36 g., 0.01 mole), phthalic anhydride (13.36 g., 0.09 mole), and hexamethylenediamine (72%) (16.12 g., 0.10 mole) at 160–180° C. for 13 hr. under an atmosphere of carbon dioxide and with intermittent stirring. The product was a red glass-like, solid polymer.

Example 3

A polyamide was prepared by heating 3,3'-dicarboxy-4,4'-dihydroxyazobenzene (3.02 g., 0.01 mole), phthalic anhydride (13.32 g., 0.09 mole), and hexamethylenediamine (72%) (16.13 g., 0.10 mole) in an atmosphere of carbon dioxide for 9 hr. at 170–180° C. The product was a brown solid polymer. It was soluble in carbitol, Cellosolve, hot pyridine, and hot nitrobenzene to give a brownish orange solution. A comparison of the original dye with this polyamide by a paper chromatographic method showed that the dye had reacted chemically and had entered the polymer structure.

Example 4

A polyamide was prepared by heating a mixture of 1 - (4 - aminophenylazo) - 2 - methyl - 4 - amino - 5 - methoxybenzene (2.56 g., 0.01 mole), phthalic anhydride (14.81 g., 0.10 mole) and hexamethylenediamine (14.5 g., 0.09 mole) for 7 hr. at 171–179° C., under an atmosphere of carbon dioxide. The product was an orange-red solid polymer, which gave a yellow solution in pyridine. Comparison of the original dye and the colored polymer by means of paper chromatography showed that the dye reacted chemically with the other components to produce a polymer in which the dye molecule had become an integral part of the polymeric structure.

Monomeric polyfunctional acids are caused to react with polyfunctional basic dye molecules or polyhydroxy dye molecules to yield polymers containing as an integral part of their molecular structure, the dye molecule. Alternately, polyfunctional acids can be reacted with polyhydroxy compounds in the presence of a polyfunctional dye material that is capable of reacting with either the acid or the hydroxy compound.

The products of the above reactions, as illustrated by Examples 5 to 9, are colored polyamides, colored polyesters and colored polyamide-polyesters, containing as an internal, repeating integral, part of the molecular structure, the dye molecules.

Illustrative examples for polyamides have been given above. Typical polyesters would be represented by a structural formula similar to that indicated for polyamides except that $NH_2$ and NH as shown in the polyamide structures would be replaced by OH and O— respectively. Typical polyamide-polyesters would also be represented by similar structures except that only a portion of the $NH_2$ groups and NH groups would be replaced by OH and O— respectively.

*Example 5*

A colored polyamide was prepared by heating 1-(4-aminophenylazo) - 2 - methyl-4-amino-5-methoxybenzene (38.4 g., 0.15 mole) and 89.5 g., 0.15 mole, of a difunctional acid (Emery 3019–S dimer fatty acid, product of Emery Industries, Carew Tower, Cincinnati, Ohio) at 162–192° C. for 11 hr. under a protective atmosphere of nitrogen with stirring. The reaction mixture gelled just prior to the removal of heat. Up to this time, the material was a rather fluid liquid. This gellation proved that reaction had taken place between the dye and the acid. The product was a dark colored brittle, solid polymer. A solution of the colored polymer in a 1:1 mixture of ethanol, and toluene was yellow. An infrared spectrum of the product showed that amide linkages had been formed between the dye and the polyfunctional acid.

*Example 6*

The dye 1-(4-hydroxyphenylazo) - 2 - hydroxynaphthalene (52.8 g., 0.20 mole) and phthalic anhydride (29.6 g., 0.20 mole) were reacted at 167–195° C. for 16.5 hr. under an atmosphere of nitrogen with stirring. The product was an extremely brittle, solid colored polymer. When the colored polymer was dissolved in acetone a dark red solution resulted. The presence of ester groups, confirming that the desired polymerization had occurred, was proved by means of infrared analysis.

*Example 7*

A polyester was prepared by heating 1-(4-hydroxyphenylazo)-2-hydroxynaphthalene (2.64 g., 0.01 mole), phthalic anhydride (14.81 g., 0.10 mole), and ethylene glycol (5.57 g., 0.09 mole) at 160–180° C. for 13 hr. under an atmosphere of carbon dioxide. The product was a dark red, solid polymer, soluble in acetone. A paper chromatogram, comparing the colored polymer with the original dye, showed that the dye was chemically a part of the polymer.

*Example 8*

The dye 1-(2-carboxyphenylazo)-2-hydroxy-3-naphthoic acid (3.36 g., 0.01 mole), phthalic anhydride (13.33 g., 0.09 mole), and ethylene glycol (18.67 g., 0.30 mole) were heated together in an atmosphere of carbon dioxide at 189–194° C. for 13 hr. The product, a polyester, was a clear red grease-like material at room temperature, and was soluble in acetone. A comparison of the visible spectrum and chromatograms of the dye (absorption maximum at 495 millimicrons) with that of the colored polymer (absorption maximum at 485 millimicrons) showed that the dye was chemically combined with the other starting materials. The $R_f$ value of the original dye developed with acetone on paper strips was 0.41 while the $R_f$ value of the colored polymer was 0.97. (Measurements were made to the front of the spots since the original dye produced a streak under these conditions.)

*Example 9*

A polyester was prepared by heating eosine (28.4 g., 0.05 mole), adipic acid (43.8 g., 0.30 mole), and ethylene glycol (43.4 g., 0.70 mole) for 17 hr. at 139–201° C. under an atmosphere of carbon dioxide and with stirring. The product was a red solid polymer. The fact that the dye had become a part of the polyester was shown by comparing $R_f$ values of the original dye with that of the colored polymer. Development of the paper strip chromatograms with ethanol resulted in an $R_f$ value of 0.52 for the dye and 0.99 for the colored polymer.

Monomeric polyfunctional hydroxy compounds are caused to react with polyfunctional acid dye molecules or simple esters of polyfunctional acid dye molecules as shown in Examples 10 and 11. The products from such reactions are colored polyesters containing as an internal, repeating integral part of the molecular structure, the dye molecules.

*Example 10*

The dye 1-(2-carboxyphenylazo)-2-hydroxy-3-naphthoic acid was heated with an excess of ethylene glycol for 4.5 hr. at 170–200° C. under an atmosphere of carbon dioxide. The product, a brown liquid polymer, was poured into water to precipitate the polyester formed. An infrared spectrum of the product showed that ester linkages had been formed from the dye and the ethylene glycol. In addition, a brittle, solid, colored, polymer was obtained when 1-(2-carboxyphenylazo)-2-hydroxy-3-naphthoic acid (16.8 g., 0.05 mole) was heated and stirred under a nitrogen atmosphere with ethylene glycol (9.3 g., 0.15 mole) for 17 hr. at 174–193° C.

*Example 11*

The dimethyl ester of 1-(2-carboxy-phenylazo)-2-hydroxy-3-naphthoic acid (18.2 g., 0.05 mole) was reacted with ethylene glycol (10.2 g., 0.16 mole) at 171–194° C. for 17 hr. under an atmosphere of nitrogen with mechanical stirring. The product was a dark brown, semi-solid, polymer that gave a dark red solution in methyl ethyl ketone. The fact that the desired polymerization to combine the dye molecule with the glycol had occurred, was shown by comparison of paper chromatograms of the original dye and the colored polymer.

Polyamides, polyesters, or polyamide-polyesters containing free basic functional groups are caused to react with dye molecules having acid groups under conditions that cause the elimination of water to yield colored polyamides that contain as an internal, repeating integral part of the molecular structure, the dye molecules. This is illustrated by Example 12.

*Example 12*

A mixture of 1-(2-carboxyphenylazo)-2-hydroxy-3-naphthoic acid (42.0 g., 0.25 equivalent) and an amine terminated polyamide, prepared from a difunctional acid (Emery 3019–S dimer fatty acid, product of Emery Industries, Carew Tower, Cincinnati, Ohio) and tetra-ethylene-pentamine (81.0 g., 0.50 equivalent) was heated at 131–185° C. for 17.5 hr. under an atmosphere of nitrogen and with stirring. The product was a clear red, solid polymer; the solution of the colored polymer in 1:1 toluene-ethanol was orange. Paper chromatographic comparisons of the dye with the colored polymer showed that the desired reaction had occurred. Using ethyl acetate as the solvent, $R_f$ values of 0.00 and 1.00 were obtained for the colored polymer, while the $R_f$ value for the dye was 0.81. Using ethanol (95%, denatured with 0.5% benzene by volume), an $R_f$ value of 1.00 was found for the colored polymer, as compared to 0.69 for the dye.

Polyesters or polyamide-polyesters containing free hydroxyl groups are reacted with polyacidic dye molecules to eliminate water and yield colored polyesters containing as an internal, repeating integral part of the molecular structure, the dye molecules.

Example 13

The dye 1-(2-carboxyphenylazo)-2-hydroxy-3-naphthoic acid (50.4 g., 0.30 equivalent) and a hydroxy-terminated polyester prepared from 0.5 mole of phthalic anhydride and 1.2 moles of ethylene glycol (72.8 g., 0.70 equivalent) was heated at 163–198° C. for 22 hr., with stirring and under an atmosphere of nitrogen. The product was a red semi-solid polymer. Paper chromatography confirmed that the desired reaction had occurred. Ethanol developed chromatograms gave $R_f$ values of 0.94 for the colored polymer as compared to 0.44 for the dye itself (measurements made to the front of the spots).

Polyamides, polyesters, or polyamide-polyesters containing free acid functional groups are caused to react with dye molecules having basic functional groups under conditions that cause the elimination of water to yield colored polyamides containing as an internal, repeating, integral part of the molecular structure, the dye molecules.

Example 14

The dye 1-(4-aminophenylazo)-2-methyl-4-amino-5-methoxybenzene (51.2 g., 0.30 equivalent) was reacted with 71.1 g. (0.15 equivalent) of a liquid polyester containing terminal carboxylic acid groups (prepared from 0.50 equivalent of a difunctional acid (Emery 3019–S dimer fatty acid, product of Emery Industries, Cincinnati, Ohio) and 0.20 equivalent of ethylene glycol) at 170–202° C. for 14 hr. under an atmosphere of nitrogen. The product was a solid, colored polymer at room temperature and gave a yellow-brown solution in a 1:1 mixture of toluene and ethanol. The colored polymer was compared to the dye by means of paper chromatography in order to demonstrate that the desired linkages of dye monomer and polyester were produced. Chromatograms developed with petroleum ether gave $R_f$ values of 0.23 for the original dye and 0.16 for the colored polymer (measured to the front of the spots).

Polymers, for example (polyamides, polyesters, or polyamide-polyesters), containing free basic functional groups are caused to react with dye molecules having a plurality of acid groups to yield colored polymeric salts having polymeric structures in which the dye molecules are ionically bonded. The dye molecule held by the ionic bonds may be colored polymers, the subject of this invention. The fact that this concept is generally applicable to various classes of dyes is illustrated by Examples 15 through 17.

A typical structure for a polymeric salt may be conveniently represented by the following:

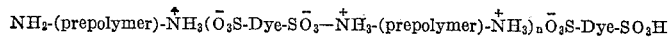

Example 15

Sulphon Acid Blue RA Extra (9.7 g., 0.05 mole) was dissolved in 600 ml. water. Concentrated hydrochloric acid (5 ml.) was added to regenerate the free sulfonic acid. Nine-tenths of an equivalent, 14.8 g., of an amine-terminated polyamide (prepared from a difunctional acid, Emery 3019–S dimerized fatty acid, a product of Emery Industries, Cincinnati, Ohio, and tetraethylenepentamine) was dissolved in 50 ml. ethanol. This polyamide solution was added to the dye solution and the mixture was stirred for 3 hrs. After standing overnight, a blue gum-like material precipitated; after drying in a vacuum desiccator the product was a dark blue, solid polymeric salt.

Example 16

A solution was prepared by dissolving Guinea Green BA (3.4 g., 0.005 mole) in 100 ml. water. To this salt solution was added 30 ml. of 0.5 N HCl to regenerate the free sulfonic acid. An amine-terminated polyamide (3.8 g., 0.0005 mole) prepared from a difunctional acid (Emery 3019–S dimer fatty acid, a product of Emery Industries, Cincinnati, Ohio) and hexamethylenediamine, was dissolved in 75 ml. of a 1:1 mixture of toluene and ethanol. This solution was added to the water solution of the dye and the mixture agitated for 30 min. The mixture was poured into approximately 1 liter of water, and the amine salt of the sulfonic acid dye which precipitated was filtered off. The product, after drying, was a dark green solid, soluble in mixed toluene-ethanol (1:1) to give a green solution. The Guinea Green BA was water-soluble; the prepared polymeric salt was not water-soluble.

Example 17

The copper chelated sodium salt of 1-(3-sulfo-1-hydroxyphenylazo)-6-sulfo-2-hydroxynaphthalene (2.4 g., 0.01 equivalent) was dissolved in 100 ml. water. To the solution was added 30 ml. of 0.5 N HCl to regenerate the free sulfonic acid. An amine terminated polyamide (3.8 g., 0.01 equivalent), prepared from hexamethylenediamine and a difunctional acid (Emery 3019–S dimerized fatty acid, a product of Emery Industries, Cincinnati, Ohio) was dissolved in 75 ml. of a 1:1 mixture of toluene and denatured alcohol. These two solutions were then thoroughly mixed for 30 min. This mixture was then drowned with water to force the salt out of solution. After filtering and drying, a red solid was obtained. This polymeric salt was insoluble in water, in contrast to the dye itself which was water-soluble.

Polymers, for example (polyamides, polyesters, or polyamide-polyesters) containing free acid functional groups are caused to react with dye molecules having a plurality of basic groups to yield colored polymeric salts having a polymeric structure in which the dye molecules are ionically bonded. The dye molecules held by the ionic bonds may also be colored polymers, the subject of this invention.

Example 18

A carboxylic acid-terminated polyester (4.7 g., 0.01 equivalent) was reacted in acetone solution with 1-(4-aminophenylazo) - 2 - methyl-4-amino-5-methoxybenzene (1.3 g., 0.01 equivalent). Water was then added to the solution, thus causing the salt to be precipitated. A gold-colored polymeric salt was obtained after filtering and drying. It melted at 132–134° C., whereas the dye itself melted at 141–143° C.

Dye molecules that are polyfunctional acids, polyfunctional bases, and/or polyhydroxy dyes, can serve as curing agents or hardeners for epoxy type polymeric materials. Results of such a reaction is a colored epoxy resin in which the dye molecules are internal, repeating, integral parts of the polymeric resin structure. The chemical linkages formed in the resulting colored epoxy resin obviously depend upon the hardeners used, i.e., polyhydroxy dyes lead to formation of ether linkages, polyfunctional amines lead to formation of amine linkage, and polycarboxylic acids lead to formation of ester and/or ether linkage, etc. Some useful combinations are illustrated by Examples 19 to 24.

Example 19

An Epon Resin, Shell Epon 828, a product of Shell Chemical Corp., New York, N.Y. (10 g.), was cured with 4.0 g. of 3,3'-dicarboxy-4,4'-dihydroxyazobenzene. The dye was mixed with the resin and cure effected by heating for 28 hr. at 76–80° C. and then for 56 hr. at 105–110° C. The fact that a solid colored polymer resulted demonstrated that curing had taken place.

Example 20

An Epon Resin, Shell Epon 828, a product of Shell Chemical Corp., New York, N.Y., was mixed with 4, 8, 12 and 16% by weight Methyl Violet Base and cured at 105° C. for 12 hr. The products were solid colored polymers. That reaction had occurred between the dye and the Epon Resin was confirmed by the fact that the absorption maxima of the colored polymers were approximately 5 millimicrons different from that of the original dye.

*Example 21*

An Epon Resin, Shell Epon 828, a product of Shell Chemical Corp., New York, N.Y., was mixed with 12, 16 and 20% by weight Rhodamine B Base and heated at 105° C., for 4 days. At this time the materials had cured to produce solid colored polymers. Reaction between the Epon Resin and the dye was established by the fact that the absorption maxima of the colored polymers were approximately 10 millimicrons different from that of the original dye.

*Example 22*

Ten grams of an Epon Resin, Shell Epon 828, a product of Shell Chemical Corp., New York, N.Y., was cured with 2.5 g. Safranine T. The dye was mixed with the resin, and the resin cured by heating for 28 hr. at 76–80° C. and for 32 hr. at 105–110° C. The product, a hard solid, demonstrated that the dye had cured the epoxy resin to a colored polymer.

*Example 23*

An Epon Resin, Shell Epon 828, a product of Shell Chemical Corp., New York, N.Y. (10.0 g.), was heated with Alizarine Blue 2RC (9.1 g.) on a hot plate until the resin was cured to a solid colored polymer (approximately 30–45 min.).

*Example 24*

Ten grams of an Epon Resin, Shell Epon 828, a product of Shell Chemical Corp., New York, N.Y., was cured with 3.0 g. of 1-(4-hydroxyphenylazo)-2-hydroxynaphthalene. The mixture of dye and resin was heated at 76–80° C. for 28 hr. and at 105–110° C. for 72 hr. The product was a hard, solid colored polymer. A more rapid cure was obtained when the Epon Resin (10.0 g.) was heated with the dye (7.9 g.) on a hot plate for 5–10 min. The resin was cured to a solid colored polymer.

*Example 25*

Two parts of the 1,3-dimethyl-1,3-diphenylguanidine salt of Congo red was stirred into 8 parts of an Epon Resin, Shell Epon 828, a product of Shell Chemical Corp., New York, N.Y., and sufficient propylene glycol-diethylene glycol monoethyl ether (one to nine parts) mixture was added to effect solution of the dye. This mixture when heated uncovered for 15 hr. at 105° C. polymerized to a solid colored polymer. That reaction had occurred between the dye and the Epon resin was confirmed by the fact that the absorption maximum of the colored polymer was 15 millimicrons different from that of the original dye.

Dye molecules that are polyfunctional alcohols, phenols, acids, or amines are reacted with polyfunctional isocyanates to yield colored polyurethane type polymers in which the dye molecules are internal, repeating integral parts of the molecular structure of the colored polymer.

*Example 26*

A diamino azo dye, 1-(4-aminophenylazo)-2-methyl-4-amino-5-methoxy-benzene (2.58 g., 0.01 mole), was dispersed in toluene. To this was added 2,4-toluenediisocyanate (1.74 g., 0.01 mole). The mixture was refluxed for about 1 hr. The polymer after filtering and drying, was a soft powder, having an orange color. It melted at 276–278° C., the dye itself melted at 141–143° C. Proof of reaction was obtained by infrared analysis.

Polyisocyanates are caused to react with colored polymers (the subject of this invention) that contain a plurality of reactive terminal functional groups (alcoholic, phenolic, basic, or acidic) to yield colored polyurethanes in which the colored polymer structures are contained as internal, repeating integral parts of the polyurethane-molecular structure.

*Example 27*

A hydroxy-terminated colored polymer containing segmers made from 1-(2-carboxyphenylazo)-2-hydroxy-3-naphthoic acid, adipic acid, and ethylene glycol (14.4 g., 0.12 equivalent) was reacted with 7.5 g., 0.09 equivalent of 2,4-toluenediisocyanate in the presence of 0.1 g. of alphamethylbenzyldimethylamine (catalyst). There was sufficient water present in the colored polyester to cause the mixture to foam during the ensuing exothermic reaction. After cooling, the new polymeric product, was a very dark red, brittle foam. Several other foam samples were prepared from 2,4-toluene-diisocyanate and the colored polyester. These samples contained 14.4 g. of the colored polyester, from 5.5 g. to 8.7 g. of 2,4-toluenediisocyanate, and from 0.2 g. to 1.1 g. alpha-methylbenzyldimethylamine. Each resulted in a dark red, polymeric, foamed product.

Simple esters of polyhydroxy dyes (alcoholic and phenolic) when reacted with polyfunctional acidic compounds, monomers, or polymers, yield colored polymers; the colored polymers having incorporated into their molecular structure, the dye portion of the simple esters.

*Example 28*

The acetate of 1-(4-hydroxyphenylazo)-4-hydroxybenzene (10.7 g., 0.03 mole) was reacted with phthalic anhydride (4.4 g., 0.03 mole) at 170–176° C., under a nitrogen atmosphere. Acetic acid was evolved as the phthalic anhydride replaced the acetate portion of the dye molecule. The product was a brown, solid polymer.

In the above examples where the general term "acid" is used, either carboxylic acid, or sulfonic acid, or acid anhydride, or acid chloride, or esters, may be substituted. For the general term "base" where used, hydroxyl, primary, secondary, tertiary, or quaternary amine may be substituted. For the general term "hydroxyl" or "hydroxy," phenolic or alcoholic hydroxyl groups and esters of such phenolic or alcoholic hydroxyl groups may be substituted.

The present invention has been described in detail above for purposes of illustration only and is not intended to be limited by this description or otherwise except as defined in the appended claim.

We claim:

A colored film-forming polyester having an organic dye compound forming an integral, internal part of the continuous polymeric structure of:
 (a) eosine,
 (b) ethylene glycol,
 (c) and adipic acid.

References Cited by the Examiner

UNITED STATES PATENTS

| | | | |
|---|---|---|---|
| 2,127,236 | 8/1938 | Schlack | 8—57 |
| 2,188,889 | 1/1940 | Clocker | 260—149 |
| 2,215,196 | 9/1940 | Schlack | 8—29 |
| 2,232,892 | 2/1941 | Von Kenck | 8—1 |
| 2,274,551 | 2/1942 | Kenyon | 260—152 |
| 2,277,393 | 3/1942 | Depew | 260—37 |
| 2,310,943 | 2/1943 | Dorough | 260—73 |
| 2,330,291 | 9/1943 | Kirby | 260—562 |
| 2,396,275 | 3/1946 | Kirby | 96—100 |
| 2,415,381 | 2/1947 | Woodward | 96—100 |
| 2,423,460 | 7/1947 | McQueen | 96—100 |
| 2,428,108 | 9/1947 | McQueen | 96—100 |
| 2,444,333 | 6/1948 | Castan | 260—47 |
| 2,473,403 | 6/1949 | Woodward | 260—310 |
| 2,600,593 | 6/1952 | Weber | 260—39 |
| 2,632,004 | 3/1953 | Minsk | 260—87.3 |
| 2,647,104 | 7/1953 | Shivers | 260—152 |

(Other references on following page)

UNITED STATES PATENTS

| | | | |
|---|---|---|---|
| 2,727,034 | 12/1955 | McLaughlin | 260—231 |
| 2,732,382 | 1/1956 | Minsk | 260—379 |
| 2,762,789 | 9/1956 | Fisher | 260—75 |
| 2,992,206 | 7/1961 | Youle et al. | 260—75 |
| 3,081,281 | 3/1963 | Beghin | 260—78 |

FOREIGN PATENTS

| | | |
|---|---|---|
| 23,495 | 11/1956 | Australia. |
| 769,344 | 3/1957 | Great Britain. |
| 108,329 | 10/1958 | Pakistan. |

OTHER REFERENCES

Barringer: Rigid Urethane Foams—II Chemistry and Formulation, E. I. Du Pont Chemicals Dept., Wilmington, Delaware (HR–26, April 1958), pages 4–15.

SAMUEL H. BLECH, *Primary Examiner.*

DANIEL ARNOLD, PHILLIP E. MANGAN, WILLIAM H. SHORT, *Examiners.*

A. G. MORIN, LOUISE P. QUAST, H. D. ANDERSON, *Assistant Examiners.*